(No Model.)
P. W. CORCORAN.
HARNESS CHECK HOOK.
No. 352,519. Patented Nov. 16, 1886.
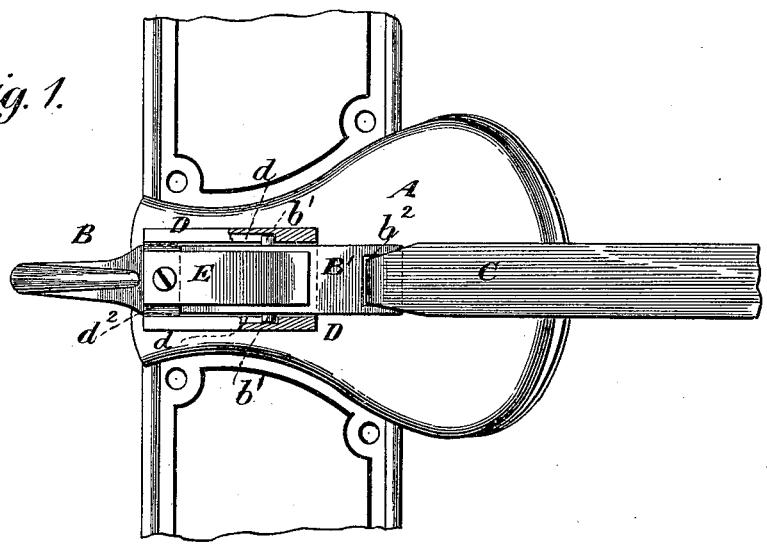
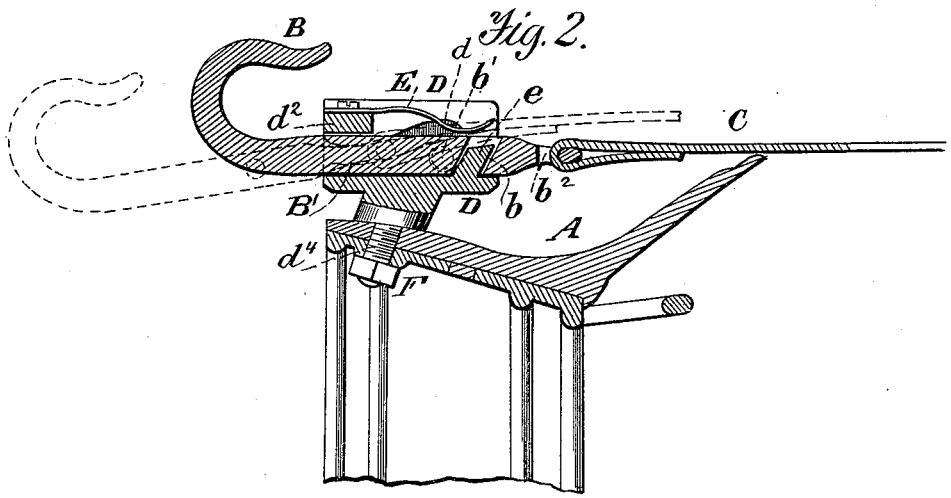
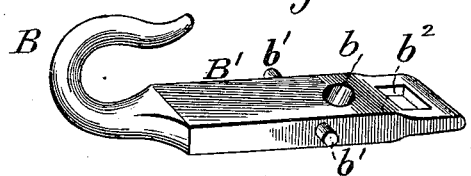
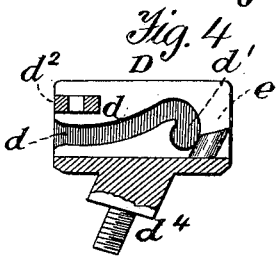
Witnesses.
A. Ruppert,
H. R. Avant,
Inventor:
Patrick W. Corcoran
Per
Thomas P. Simpson
Atty

UNITED STATES PATENT OFFICE.

PATRICK W. CORCORAN, OF SENECA, ILLINOIS.

HARNESS CHECK-HOOK.

SPECIFICATION forming part of Letters Patent No. 352,519, dated November 16, 1886.

Application filed June 19, 1886. Serial No. 205,632. (No model.)

*To all whom it may concern:*

Be it known that I, PATRICK W. CORCORAN, a citizen of the United States, residing at Seneca, in the county of La Salle and State of Illinois, have invented certain new and useful Improvements in Harness Check-Hooks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention has for its object to allow the driver of a vehicle, without leaving his seat, to loosen the check-rein of the bridle so that the animal may drink, pull to more advantage in going up hill, and be greatly relieved when tired.

Figure 1 of the drawings is a plan view showing the invention applied to a harness-saddle. Fig. 2 is a longitudinal vertical section on a median line of Fig. 1. Fig. 3 is a detail view in perspective of the check-hook, and Fig. 4 a detail view of the metallic trough.

In the drawings, A represents a harness-saddle, and B the hook which holds the check-rein. This hook has a shank, B', having the hole $b$, side studs, $b'$ $b'$, and cross-slot $b^2$ in the rear end, to which is attached a strap, C, extending within reach of the driver.

D is a metallic trough having the opposite inside longitudinal grooves, $d$ $d$, which incline downwardly toward the front and are curved down at the rear, so as to form the pockets $d'$ $d'$. In the latter drop the side studs, $b'$ $b'$, which are held in the pockets by the superposed springs E, secured at one end on the cross-bar $d^2$.

$e$ is a rearwardly-inclined stud rising from the bottom of trough D, to enter the hole $b$ of the hook-shank B'. Thus it will be seen that the hook-shank is locked to the trough by the stud $e$ and hole $b$, or by the side studs, $b'$ $b'$, and pockets $d'$ $d'$. I preferably use both together although either may be used singly with good effect.

The trough-grooves $d$ $d$ not only incline downwardly toward the front, but are there open to allow the hook-shank B' to slide out and rest upon the neck whenever the driver raises and pulls the strap C.

$d^4$ represents a threaded shank, which passes through the saddle and receives nut F.

What I claim as new, and desire to protect by Letters Patent, is—

1. The harness check-hook shank B', having the hole $b$, in combination with a trough, D, having the rearwardly-inclined stud $e$, as and for the purpose described.

2. The harness check-hook shank B', having the opposite grooves, $d$ $d$, inclined toward as well as open at the front, and provided with the rear pockets, $d'$ $d'$, as and for the purpose set forth.

3. The combination of the harness-saddle, a trough, D, having side grooves, $d$ $d$, and rearwardly-inclined bottom stud, $e$, and the loose check-hook B on shank B', the said shank having hole $b$, cross-slot $b^2$, side studs, $b'$ $b'$, and an attached strap, C, as and for the purpose described.

In testimony whereof I affix my signature in presence of two witnesses.

PATRICK W. CORCORAN.

Witnesses:
HERBERT S. CRANE,
CHARLES W. CHANDLER.